United States Patent Office 2,710,304
Patented June 7, 1955

2,710,304
PRODUCTION OF CYSTEIN AND ISOCYSTEIN HYDROHALIDES

Adolf Christian Josef Opfermann, Bergisch-Gladbach, Germany

No Drawing. Application April 3, 1952,
Serial No. 280,371

Claims priority, application Austria April 7, 1951

13 Claims. (Cl. 260—534)

The invention relates to a process for the production of cystein and isocystein hydrohalides.

It is known to react dibromopropionic acid with zinc to form acrylic acid.

It is also known to prepare mercaptans from halogen compounds and potassium hydrosulphide. Finally, the synthetic production of aminocarboxylic acid by reacting halogen fatty acids with ammonia or potassium phthalimide has been described and there has also been mentioned the synthesis of aminocarboxylic acids from aminonitriles which are obtained from the corresponding cyanhydrins and ammonia.

All these processes have nothing to do with the subject matter of the invention. A combination of these processes would also not lead to the synthesis of cystein or isocystein.

The object of the invention is to prepare hydrohalides of cystein and isocystein from acrylic acid or acrylonitrile.

According to the invention, acrylic acid is treated with halogens, the α,β-dihalogenpropionic acids obtained are reacted with alkali hydrosulphides to form α-halogen-β-mercaptopropionic acids or α-mercapto-β-halogenpropionic acids and the latter are converted with ammonia into cystein hydrohalides or isocystein hydrohalides. If, in the process according to the invention, acrylonitrile is used as the initial material for the cystein or isocystein synthesis, the α-amino-β-mercaptopropionitriles or α-mercapto-β-amino-propionitriles obtained as intermediate products are saponified with acids or alkalies to give the desired final products.

The reactions are represented diagrammatically by the following equations, in which the reaction of an alkali hydrosulphide is represented as of potassium hydrosulphide and in which X denotes a halogen.

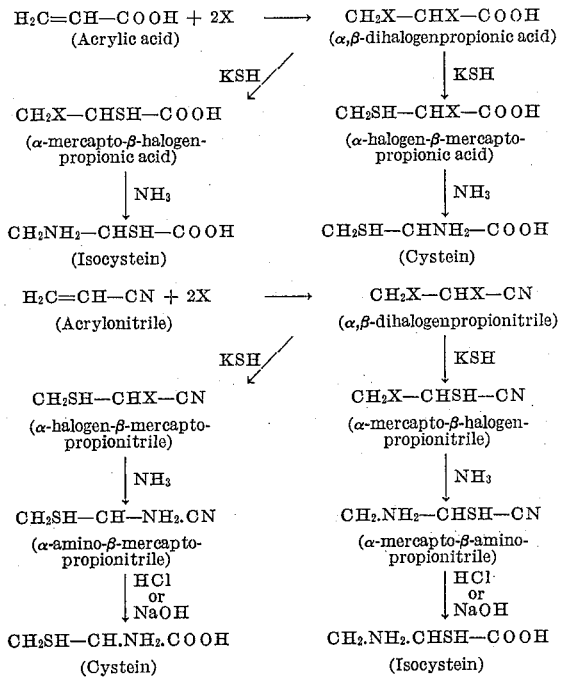

In the opinion of experts, it was not to be foreseen with certainty that the desired final products, namely cystein and isocystein, would be obtained in the reaction of α,β-dihalogenpropionic acids with potassium hydrosulphide. On the contrary, it was to be expected that reactions other than those represented above might take place. For example, the aforesaid reaction might have led to the formation of ammonium sulphide, secondary amines or other compounds. It was therefore surprising that this reaction has led to the formation of cystein or isocystein in good yields.

In carrying out the process according to the invention, the reaction of acrylic acid or acrylonitrile with halogens is carried out with cooling, advantageously with good ice cooling. In doing this, it is important not to add the halogen too rapidly. Chlorine may be passed in slowly, whilst bromine is allowed to drop in slowly. Yields of up to 70% of the theoretical of α,β-dihalogenpropionic acids or of α,β-dihalogenpropionitriles are obtained. The α,β-dihalogenpropionic acids or α,β-dihalogenpropionitriles obtained are treated with alkali hydrosulphides, for example potassium hydrosulphide, in organic solvents which do not react chemically with the reactants. For this purpose, methanol, for example, may be employed. In addition to the α-halogen-β-mercaptopropionic acids or α-halogen-β-mercaptopropionitriles, the isomeric α-mercapto-β-halogenpropionic acids or α-mercapto-β-halogenpropionitriles are obtained in an equal quantity. If acrylic acid were used as the initial substance, the α-halogen-β-mercaptopropionic acids or the isomeric α-mercapto-β-halogenpropionic acids can be reacted directly with ammonia to form cystein hydrohalides or isocystein hydrohalides. The ammonia may be employed in the form of its aqueous solution or in the form of ammonia gas.

If acrylonitrile were selected as the initial substance, the α-halogen-β-mercaptonitrile or the α-mercapto-β-halogennitrile can also first be reacted with ammonia gas or solutions of ammonia to form the corresponding amino compounds and the latter are then saponified with solutions of alkalies, such as a solution of caustic potash or of caustic soda, or acids, for example hydrochloric acid, to form cystein hydrohalides or isocystein hydrohalides.

By the process according to the invention, cystein hydrohalides and isocystein hydrohalides are obtained in good yields, each of about 45%. Cystein hydrohalides and isocystein hydrohalides are valuable amino acids.

Example 250 gms. of acrylonitrile are cooled with ice. 800 gms. of bromine are allowed to drop in slowly, while cooling well with ice. The addition of bromine is completed within 4 hours. The reaction mixture is then kept for 2 hours at 40° C. and is then distilled in vacuo. The α,β-dibromo-propionitrile passes over at 20 mms. of mercury at 90–95° C. The yield amounts to 70% of the theoretical. 213 gms. of α,β-dibromopropionitrile are treated, while cooling well with ice, with 72 gms. of potassium hydrosulphide dissolved in methanol. After 3–5 hours, the reaction is finished, and the separated potassium bromide is filtered off by suction. The methanol is then removed in vacuo at a temperature of 20° C. and the crude α-bromo-β-mercaptopropionitrile is treated with 200 gms. of a 20% solution of ammonia. The hydrobromide of α-amino-β-mercaptopropionitrile is formed, which can be easily converted into cystein hydrobromide by saponification with hydrochloric acid.

What I claim is:

1. In a process for the production of cystein hydrohalides and isocystein hydrohalides, the steps of treating a member selected from the group consisting of acrylic acid and acrylonitrile directly with a halogen while cooling, reacting the obtained α,β-dihalogen compound with an alkali hydrosulphide to form the corresponding α-halogen-β-mercapto and α-mercapto-β-halogen compounds, and subjecting the latter to the action of ammonia gas.

2. A process for the production of cystein hydrohalides and isocystein hydrohalides, comprising treating acrylic acid directly with a halogen while cooling, reacting the α,β-dihalogenpropionic acid obtained with an alkali hydrosulphide to form α-halogen-β-mercaptopropionic acid and α-mercapto-β-halogenpropionic acid and converting the two latter compounds with ammonia gas into cystein hydrohalide and isocystein hydrohalide.

3. A process for the production of cystein hydrohalides and isocystein hydrohalides, comprising treating acrylic acid directly with a halogen while cooling, reacting the α,β-dihalogenpropionic acid obtained with potassium hydrosulphide to form α-halogen-β-mercaptopropionic acid and α-mercapto-β-halogenpropionic acid and converting the two latter compounds with ammonia gas into cystein hydrohalide and isocystein hydrohalide.

4. A process for the production of cystein hydrohalides and isocystein hydrohalides, comprising treating acrylic acid directly with a halogen while cooling, reacting the α,β-dihalogenpropionic acid obtained with an alkali hydrosulphide in an organic solvent to form α-halogen-β-mercaptopropionic acid and α-mercapto-β-halogenpropionic acid and converting the two latter compounds with ammonia gas into cystein hydrohalide and isocystein hydrohalide.

5. A process for the production of cystein hydrohalides and isocystein hydrohalides, comprising treating acrylic acid directly with a halogen while cooling, reacting the α,β-dihalogenpropionic acid obtained with an alkali hydrosulphide in methanol to form α-halogen-β-mercaptopropionic acid and α-mercapto-β-halogenpropionic acid and converting the two latter compounds with ammonia gas into cystein hydrohalide and isocystein hydrohalide.

6. A process for the production of cystein hydrohalides and isocystein hydrohalides, comprising treating acrylic acid directly with a halogen while cooling, reacting the α,β-dihalogenpropionic acid obtained with an alkali hydrosulphide to form α-halogen-β-mercaptopropionic acid and α-mercapto-β-halogenpropionic acid and converting the two latter compounds with solutions of ammonia into cystein hydrohalide and isocystein hydrohalide.

7. A process for the production of cystein hydrohalides and isocystein hydrohalides, comprising treating acrylonitrile directly with a halogen while cooling, reacting the α,β-dihalogenpropionitrile obtained with an alkali hydrosulphide to form α-halogen-β-mercaptopropionitrile and α-mercapto-β-halogenpropionitrile, converting the two latter compounds with ammonia gas into α-amino-β-mercaptopropionitrile and α-mercapto-β-aminopropionitrile and saponifying the two last mentioned compounds with an acid to form cystein hydrohalide and isocystein hydrohalide.

8. A process for the production of cystein hydrohalides and isocystein hydrohalides, comprising treating acrylonitrile directly with a halogen while cooling, reacting the α,β-dihalogenpropionitrile obtained with potassium hydrosulphide to form α-halogen-β-mercaptopropionitrile and α-mercapto-β-halogenpropionitrile, converting the two latter compounds with ammonia gas into α-amino-β-mercaptopropionitrile and α-mercapto-β-aminopropionitrile and saponifying the two last mentioned compounds with an acid to form cystein hydrohalide and isocystein hydrohalide.

9. A process for the production of cystein hydrohalides and isocystein hydrohalides, comprising treating acrylonitrile directly with a halogen while cooling, reacting the α,β-dihalogenpropionitrile obtained with an alkali hydrosulphide in an organic solvent to form α-halogen-β-mercaptopropionitrile and α-mercapto-β-halogenpropionitrile, converting the two latter compounds with ammonia gas into α-amino-β-mercaptopropionitrile and α-mercapto-β-aminopropionitrile and saponifying the two last mentioned compounds with an acid to form cystein hydrohalide and isocystein hydrohalide.

10. A process for the production of cystein hydrohalides and isocystein hydrohalides, comprising treating acrylonitrile directly with a halogen while cooling, reacting the α,β-dihalogenpropionitrile obtained with an alkali hydrosulphide in methanol to form α-halogen-β-mercaptopropionitrile and α-mercapto-β-halogenpropionitrile, converting the two latter compounds with ammonia gas into α-amino-β-mercaptopropionitrile and α-mercapto-β-aminopropionitrile and saponifying the two last mentioned compounds with an acid to form cystein hydrohalide and isocystein hydrohalide.

11. A process for the production of cystein hydrohalides and isocystein hydrohalides, comprising treating acrylonitrile directly with a halogen while cooling, reacting the α,β-dihalogenpropionitrile obtained with an alkali hydrosulphide to form α-halogen-β-mercaptopropionitrile and α-mercapto-β-halogenpropionitrile, converting the two latter compounds with solutions of ammonia into α-amino-β-mercaptopropionitrile and α-mercapto-β-aminopropionitrile and saponifying the two last mentioned compounds with an acid to form cystein hydrohalide and isocystein hydrohalide.

12. A process for the production of cystein hydrohalides and isocystein hydrohalides, comprising treating acrylonitrile directly with a halogen while cooling, reacting the α,β-dihalogenpropionitrile obtained with an alkali hydrosulphide to form α-halogen-β-mercaptopropionitrile and α-mercapto-β-halogenpropionitrile, converting the two latter compounds with ammonia gas into α-amino-β-mercaptopropionitrile and α-mercapto-β-aminopropionitrile and saponifying the two last mentioned compounds with hydrochloric acid to form cystein hydrohalide and isocystein hydrohalide.

13. A process for the production of cystein hydrohalides and isocystein hydrohalides, comprising treating acrylonitrile directly with a halogen while cooling, reacting the α,β-dihalogenpropionitrile obtained with an alkali hydrosulphide to form α-halogen-β-mercaptopropionitrile and α-mercapto-β-halogenpropionitrile, converting the two latter compounds with ammonia gas into α-amino-β-mercaptopropionitrile and α-mercapto-β-aminopropionitrile and saponifying the two last mentioned compounds with a solution of an alkali to form cystein hydrohalide and isocystein hydrohalide.

References Cited in the file of this patent

UNITED STATES PATENTS

| | | |
|---|---|---|
| 2,365,808 | D'Ianni | Dec. 26, 1944 |
| 2,390,470 | Sumner | Dec. 4, 1945 |
| 2,406,362 | Farlow | Aug. 27, 1946 |
| 2,443,292 | Bauer et al. | June 15, 1948 |
| 2,552,026 | Bauer et al. | May 8, 1951 |

OTHER REFERENCES

Fischer et al., Liebig's Ann., vol. 383, pp. 363–72 (1911).

Block, Chem. Reviews, vol. 38, pages 514, 515, 553, 557 (1946).

Richter, Organic Chem., 3rd Eng. ed., vol. 1, pages 171, 335 and 336.